United States Patent
Patil et al.

(10) Patent No.: US 11,130,707 B2
(45) Date of Patent: Sep. 28, 2021

(54) HYDRATING SWELLABLE CLAYS

(71) Applicant: Halliburton Energy Services, Inc., Houston, TX (US)

(72) Inventors: Sandip Prabhakar Patil, Pune (IN); Waseem Abdulrazzaq, Al Khobar (SA); Sheetal Singh, Pune (IN); Vaishali Mishra, Pune (IN); Reem Mohammed Alburaikan, Al Khobar (SA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/880,839

(22) Filed: May 21, 2020

(65) Prior Publication Data

US 2020/0283336 A1 Sep. 10, 2020

Related U.S. Application Data

(62) Division of application No. 16/330,726, filed as application No. PCT/US2016/056780 on Oct. 13, 2016, now Pat. No. 10,703,676.

(51) Int. Cl.
| | |
|---|---|
| *E21B 33/14* | (2006.01) |
| *E21B 43/267* | (2006.01) |
| *C04B 14/10* | (2006.01) |
| *C04B 28/04* | (2006.01) |
| *C09K 8/467* | (2006.01) |

(Continued)

(52) U.S. Cl.
CPC .............. *C04B 14/10* (2013.01); *C04B 28/04* (2013.01); *C09K 8/145* (2013.01); *C09K 8/16* (2013.01); *C09K 8/18* (2013.01); *C09K 8/467* (2013.01); *C09K 8/665* (2013.01); *C09K 8/68* (2013.01); *C09K 8/80* (2013.01); *C09K 8/845* (2013.01);

(Continued)

(58) Field of Classification Search
CPC ......... C04B 14/10; C04B 28/04; C09K 8/145; C09K 8/16; C09K 8/467; C09K 8/68; C09K 8/80; C09K 8/845; E21B 33/14; E21B 43/267; E21B 43/04; Y02W 30/92; Y02W 30/94; Y02W 30/95
See application file for complete search history.

(56) References Cited

U.S. PATENT DOCUMENTS

| | | |
|---|---|---|
| 4,500,436 A | 2/1985 | Pabley |
| 5,226,481 A | 7/1993 | Le et al. |

(Continued)

FOREIGN PATENT DOCUMENTS

WO 2004090282 10/2004

OTHER PUBLICATIONS

ISRWO International Search Report and Written Opinion for PCT/US2016/056780 dated Aug. 17, 2018.

(Continued)

*Primary Examiner* — Silvana C Runyan
(74) *Attorney, Agent, or Firm* — Thomas Rooney; C. Tumey Law Group PLLC

(57) ABSTRACT

A treatment fluid may comprise: a water having hardness at about 300 ppm or greater, a plurality of particulates, a swellable clay, a chelating agent at about 0.01% to about 5% by weight of the water (BWOW); and an alkali metal base at about 0.01% to about 5% BWOW, wherein the chelating agent and alkali metal base reduce the negative effect of the water on hydrating swellable clays.

20 Claims, 5 Drawing Sheets

(51) Int. Cl.
*C09K 8/66* (2006.01)
*C09K 8/68* (2006.01)
*C09K 8/16* (2006.01)
*C09K 8/84* (2006.01)
*C09K 8/14* (2006.01)
*C09K 8/18* (2006.01)
*C09K 8/80* (2006.01)
*E21B 43/04* (2006.01)

(52) U.S. Cl.
CPC ............ *E21B 33/14* (2013.01); *E21B 43/267* (2013.01); *E21B 43/04* (2013.01); *Y02W 30/91* (2015.05)

(56) References Cited

U.S. PATENT DOCUMENTS

| | | | | |
|---|---|---|---|---|
| 5,228,808 A | * | 7/1993 | McKennon | C09K 17/06 106/706 |
| 5,361,842 A | * | 11/1994 | Hale | C09K 8/145 166/293 |
| 2003/0029616 A1 | * | 2/2003 | Maberry | C09K 8/512 166/294 |
| 2006/0073983 A1 | * | 4/2006 | Patel | C09K 8/24 507/129 |
| 2011/0120713 A1 | * | 5/2011 | Todd | E21B 43/267 166/280.1 |
| 2012/0073813 A1 | * | 3/2012 | Zamora | C09K 8/48 166/285 |
| 2013/0213657 A1 | | 8/2013 | Dobson, Jr. et al. | |
| 2014/0116710 A1 | | 5/2014 | Naser-El-Din et al. | |
| 2015/0080271 A1 | | 3/2015 | De Wolf et al. | |
| 2016/0289526 A1 | * | 10/2016 | Alwattari | C04B 28/02 |
| 2017/0058181 A1 | * | 3/2017 | Frantz | C04B 22/16 |

OTHER PUBLICATIONS

USPTO Office Action for U.S. Appl. No. 16/330,726 dated Dec. 6, 2019.

* cited by examiner

HYDRATING SWELLABLE CLAYS

BACKGROUND

Embodiments of the present disclosure relate to hydrating swellable clays.

Treatment fluids used in various downhole operations (e.g., drilling operations, cementing operations, and workover operations) may be viscosified with swellable clays that assist in maintaining particulates suspended in the treatment fluid. However, when preparing treatment fluids with saltwater or hard water, the chloride ion concentration or dissolved mineral concentration, respectively, have resulted in settling out of the clay and development of viscosities of only a small percentage of those which would result if fresh water were used. Without being limited by theory, the flocculation and lack of viscosity development may be due to the lessening of interparticle forces between the clay particles.

BRIEF DESCRIPTION OF THE DRAWINGS

The following figures are included to illustrate certain aspects of the embodiments and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
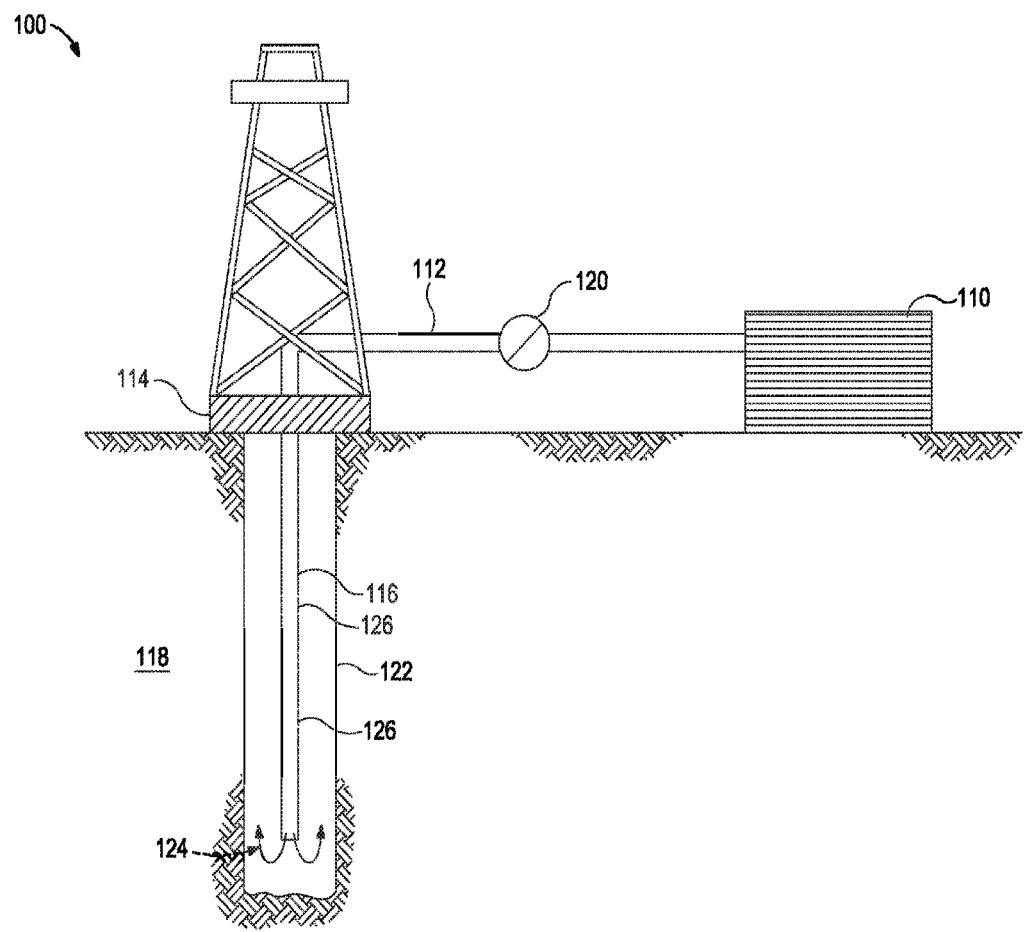
FIG. 1 shows an illustrative schematic of a system that can deliver treatment fluids of the present disclosure to a downhole location.

Embodiments of the present disclosure relate to hydrating swellable clays dispersed in water having a high hardness (i.e., hard water). In some instances, the swellable clays may be a part of a cement slurry produced with a hard water.

As used herein, the term "hard water" refers to water with dissolved calcium and magnesium. As used herein, the term "hardness" refers to the amount of dissolved calcium and magnesium in the water.

Swellable clay may be used to thicken or viscosify a treatment fluid, which aids in maintaining the particles (e.g., weighting agent, cement particles, and fillers) therein in suspension. Typically, when swellable clays are added to the treatment fluid, the water hydrates the clay causing it to swell and, consequently, viscosify the treatment fluid. Ions present in the water can lead to the clay not swelling to full size or not swelling at all. For example, water with a hardness of less than 300 ppm hydrates clays like bentonite sufficiently. Above that hardness, the amount of clay swelling can be significantly reduced.

Embodiments of the present disclosure use a combination of a chelating agent and an alkali metal base, each in relatively low concentrations, to synergistically reduce the negative impact of hard water on hydrating swellable clays. For example, as described further herein, at a hardness of 700 ppm or greater, using only 0.2% chelating agent by weight of water (BWOW) in combination with 0.1% alkali metal base BWOW can increase the gel strength of a cement slurry prepared with swellable clay by over 4 times within 10 minutes as compared to using either alone at higher concentrations.

As used herein, the term "gel strength" refers to a measure of the ability of a fluid to develop and retain a gel form. Gel strength is measured by the American Petroleum Institute recommended procedure 10B-6 and, generally, is the shear stress measured at a low shear rate after a fluid has set quiescently for 10 second, 10 minutes, or other identified time period. Unless otherwise specified, as used herein, gel strength measurements refer to 10 minute gel strength measurements.

Treatment fluids of the present disclosure may be produced by mixing water having hardness of 300 ppm to 6000 ppm with a plurality of particulates, a swellable clay, a chelating agent at about 0.01% to about 5% by BWOW, and an alkali metal base at about 0.01% to about 5% BWOW.

In some embodiments, the treatment fluids of the present disclosure may be drilling fluids or drill-in fluids where the plurality of particulates comprises weighting agents and optionally cement. In some embodiments, the treatment fluids of the present disclosure may be drilling fluids or drill-in fluids where the plurality of particulates comprises weighting agents and optionally cement. In some embodiments, the treatment fluids of the present disclosure may be fracturing fluids where the plurality of particulates comprises proppant and optionally weighting agents. In some embodiments, the treatment fluids of the present disclosure may be cement slurries where the plurality of particulates comprises cement and optionally proppants and/or weighting agents. In some embodiments, the treatment fluids of the present disclosure may be gravel-packing fluids where the plurality of particulates comprises gravel and optionally weighting agents.

Accordingly, exemplary particulates may include, but are not limited to, cement, weighting agent, proppant, gravel, and the like. Exemplary cements may include, but are not limited to, perlite, cement kiln dust, fly ash, pumicite, slag, lime, shale, Portland cement, and the like, and any combination thereof. Exemplary Portland cements may include, but are not limited to, Class A, Class C, Class H, Class G, ASTM Type III, ASTM Type V, and the like, and any combination thereof. In some embodiments, the particles are present at about 10% to about 300% BWOW.

Exemplary weighting agents may include, but are not limited to, barite, hematite, ilmentite, manganese tetraoxide, galena, calcium carbonate, and the like, and any combination thereof. In some embodiments, the weighting agent is present at about 1% to about 70% by volume of the treatment fluid. In some instances, a sufficient concentration of weighting agent may be used to achieve a treatment fluid with a density of about 9 pounds per gallon ("lb/gal") to about 22 lb/gal.

Exemplary proppants and gravels may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and the like, and any combination Exemplary swellable clays may include, but are not limited to, beidellite, montmorillonite, bentonite, nontronite, saponite, naturally occurring hectorite clay, synthetic hectorite clay, palygorskite, lasallite, and the like, and any combination thereof. In some embodiments, the swellable clay is present at about 0.1% to about 30% BWOW.

Exemplary chelating agents may include, but are not limited to, ethylenediaminetetraacetic acid (EDTA), nitrilotriacetic acid, diethylenetriaminepentaacetic acid, trans-1,2-diaminocyclohexane-N,N,N',N'-tetraacetic acid, citric acid, diglycolic acid, phosphoric acid, aspartic acid, tripolyphosphate, hexametaphosphate, aminotris (methylenephosphonic acid), 1-hydroxyethane-1,1-diphosphonic acid, dimethyl methylphosphonate, ethylenediaminetetra(methylenephosphonic acid), tetramethylenediaminetetra(methylenephosphonic acid), hexamethylenediaminetetra(methylenephosphonic acid), diethylenetriaminepenta (methylenephosphonic acid), a salt of any foregoing chelating agents (e.g., ethylenediaminetetraacetic acid disodium salt dehydrate, ethylenediaminetetraacetic acid tetrasodium salt, nitrilotriacetic acid trisodium salt, sodium tripolyphosphate, sodium hexametaphosphate, etc.), and the like, and any combination thereof.

Exemplary alkali metal bases may include, but are not limited to, lithium hydroxide, sodium hydroxide, potassium hydroxide, cesium hydroxide, and the like, and any combination thereof.

In some embodiments, the treatment fluid may further comprise dispersants. Exemplary dispersants may include but are not limited to, betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates (e.g., sodium dodecane sulfonate), trimethyl hexadecyl ammonium bromide, and the like, and any combination thereof. In some embodiments, the dispersant is present at about 0.1% to about 25% by weight of the treatment fluid.

In some instances, the treatment fluid may be a cement slurry and further comprise one or more additives like a filler, a set accelerator, a set retarder, dispersants, and the like, and any combination thereof. Exemplary fillers may include but are not limited to, hollow ceramic beads, ground marble, glass beads, crushed glass, polymer beads, and the like, and any combination thereof. In some embodiments, the filler is present at about 0.1% to about 100% by weight of the cement (BWOC). Exemplary set accelerators may include but are not limited to, calcium chloride, triethanolamine, sodium silicate, zinc formate, calcium acetate, and the like, and any combination thereof. In some embodiments, the set accelerator is present at about 0.1% to about 5% BWOC. Exemplary set retarders may include but are not limited to, tartaric acid, gluconic acid, carboxylic acids (e.g., citric acid), hydroxy carboxy acids, a sulfomethylated lignin, calcium lignosulfonates, sodium lignosulfonates, copolymers of acrylic acid and acrylamido-methyl-propane sulfonate polymer, copolymers of maleic anhydride and acrylamido-methyl-propane sulfonate polymer, and the like, and any combination thereof. In some embodiments, the set retarder is present at about 0.1% to about 5% BWOC.

Some embodiments of downhole treating may involve introducing the treatment fluid into a wellbore penetrating a subterranean formation. Exemplary downhole operations for implementing the treatment fluid of the present disclosure may include, but are not limited to, drilling operations, drill-in operations, fracturing operations, gravel packing operations, cementing operations, and the like.

For example, some embodiments may include forming a drilling fluid described herein (e.g., mixing a water having hardness at about 300 ppm or greater with a plurality of particulates (e.g., comprising weighting agent and optionally cement), a swellable clay, a chelating agent, and an alkali metal base); and drilling at least a portion of a wellbore penetrating a subterranean formation with the drilling fluid.

In another example, some embodiments may include forming a drill-in fluid described herein (e.g., mixing a water having hardness at about 300 ppm or greater with a plurality of particulates (e.g., comprising weighting agent and optionally cement), a swellable clay, a chelating agent, and an alkali metal base); and drilling at least a portion of a wellbore into a production zone of a subterranean formation with the drill-in fluid.

In yet another example, some embodiments may include forming a fracturing fluid described herein (e.g., mixing a water having hardness at about 300 ppm or greater with a plurality of particulates (e.g., comprising proppant and optionally weighting agent), a swellable clay, a chelating agent, and an alkali metal base); fracturing a portion of a subterranean formation (e.g., introducing the fracturing fluid or a pad fluid before the fracturing fluid at a rate and pressure sufficient to create or extend at least one fracture in the subterranean formation); and forming a proppant pack comprising the proppant with the proppant fluid.

In another example, some embodiments may include forming a gravel packing fluid described herein (e.g., mixing a water having hardness at about 300 ppm or greater with a plurality of particulates (e.g., comprising gravel and optionally weighting agent and/or cement), a swellable clay, a chelating agent, and an alkali metal base); and forming a gravel pack at least a portion of a wellbore and/or a subterranean formation with the gravel packing fluid.

In yet another example, some embodiments may include forming a cement slurry described herein (e.g., mixing a water having hardness at about 300 ppm or greater with a plurality of particulates (e.g., comprising gravel and optionally weighting agent and/or cement), a swellable clay, a chelating agent, and an alkali metal base); introducing the cement slurry into a wellbore penetrating a subterranean formation; and forming a set cement in at least a portion of the wellbore and/or the subterranean formation with the cement slurry. For a primary cementing operation, the cement slurry may be pumped into an annular space between the walls of the wellbore and the casing and then allowed to set to form a cement sheath between the wellbore walls and the casing. Subsequent secondary cementing operations may also be performed. One example of a secondary cementing operation is squeeze cementing whereby a cement slurry is employed to plug and seal off undesirable flow passages in the cement sheath and/or the casing.

Generally, a system for implementing the treatment fluids described herein comprises a pump fluidly connected to a wellbore penetrating a subterranean formation that introduces treatment fluid into the wellbore.

In various embodiments, systems configured for delivering the treatment fluids described herein to a downhole location are described. In various embodiments, the systems can comprise a pump fluidly coupled to a tubular, the tubular containing a treatment fluid described herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 100 may include mixing tank 110, in which a treatment fluid of the present invention may be formulated. The treatment fluid may be conveyed via line 112 to wellhead 114, where the treatment fluid enters tubular 116, tubular 116 extending from wellhead 114 into subterranean formation 118. Upon being ejected from tubular 116, the treatment fluid may subsequently penetrate into subterranean formation 118.

In some instances, upon being ejected from tubular 116, the treatment fluid may subsequently return up the wellbore in the annulus between the tubular 116 and the wellbore 122 as indicated by flow lines 124, for example, in a cementing operation. In other embodiments, the treatment fluid may be reverse pumped down through the annulus and up tubular 116 back to the surface, for example, in a reverse cementing operation.

In some instances, tubular 116 may have a plurality of orifices 126 through which the treatment fluid of the present disclosure may enter the wellbore proximal to a portion of the subterranean formation 118 to be treated, for example, in a fracturing operation or a gravel packing operation.

In some instances, the wellbore may further comprise equipment or tools (not shown) for zonal isolation of a portion of the subterranean formation 118 to be treated.

Pump 120 may be configured to raise the pressure of the treatment fluid to a desired degree before its introduction into tubular 116. It is to be recognized that system 100 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 114 and exit subterranean formation 118. In some embodiments, the treatment fluid that has flowed back to wellhead 114 may subsequently be recovered and recirculated to subterranean formation 118.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Figure 2:
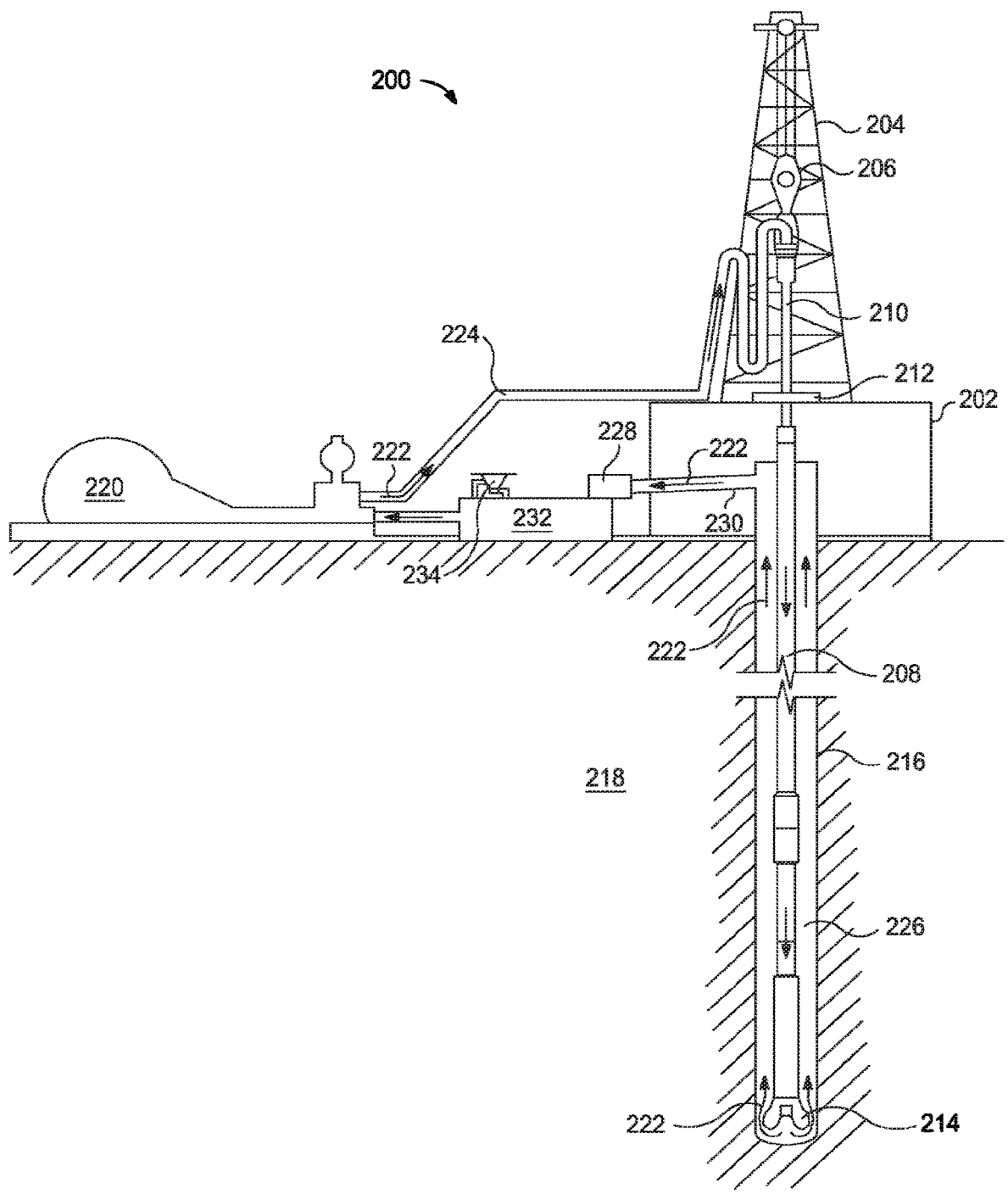
FIG. 2 shows an illustrative schematic of a drilling system for implementing a drilling fluid and/or drill-in fluid described herein.

FIG. 2, for example, illustrates a drilling system for implementing a drilling fluid and/or drill-in fluid 222 described herein. As illustrated, the drilling assembly 200 may include a drilling platform 202 that supports a derrick 204 having a traveling block 206 for raising and lowering a drill string 208. The drill string 208 may include, but is not limited to, drill pipe and coiled tubing, as generally known to those skilled in the art. A kelly 210 supports the drill string 208 as it is lowered through a rotary table 212. A drill bit 214 is attached to the distal end of the drill string 208 and is driven either by a downhole motor and/or via rotation of the drill string 208 from the well surface. As the bit 214 rotates, it creates a borehole 216 that penetrates various subterranean formations 218.

A pump 220 (e.g., a mud pump) circulates drilling fluid or drill-in fluid 222 through a feed pipe 224 and to the kelly 210, which conveys the drilling fluid or drill-in fluid 222 downhole through the interior of the drill string 208 and through one or more orifices in the drill bit 214. The drilling fluid or drill-in fluid 222 is then circulated back to the surface via an annulus 226 defined between the drill string 208 and the walls of the borehole 216. At the surface, the recirculated or spent drilling fluid or drill-in fluid 222 exits the annulus 226 and may be conveyed to one or more fluid processing unit(s) 228 via an interconnecting flow line 230. After passing through the fluid processing unit(s) 228, a "cleaned" drilling fluid or drill-in fluid 222 is deposited into a nearby retention pit 232 (i.e., a mud pit). While illustrated as being arranged at the outlet of the wellbore 216 via the annulus 226, those skilled in the art will readily appreciate that the fluid processing unit(s) 228 may be arranged at any other location in the drilling assembly 200 to facilitate its proper function, without departing from the scope of the scope of the disclosure.

One or more of the disclosed drilling fluids or drill-in fluids 222 may be formed via a mixing hopper 234 communicably coupled to or otherwise in fluid communication with the retention pit 232. The mixing hopper 234 may include, but is not limited to, mixers and related mixing equipment known to those skilled in the art. In other embodiments, however, the disclosed drilling fluids or drill-in fluids 222 may be formed at any other location in the drilling assembly 200. In at least one embodiment, for example, there could be more than one retention pit 232, such as multiple retention pits 232 in series. Moreover, the retention pit 232 may be representative of one or more fluid storage facilities and/or units where the components of the drilling fluid or drill-in fluid 222 may be stored, reconditioned, and/or regulated until added to the drilling fluid or drill-in fluid 222.

As mentioned above, the disclosed drilling fluid or drill-in fluid 222 may directly or indirectly affect the components and equipment of the drilling assembly 200. For example, the disclosed drilling fluid or drill-in fluid 222 may directly or indirectly affect the fluid processing unit(s) 228 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 228 may further include one or more sensors, gauges, pumps, compressors, and the like used store, monitor, regulate, and/or recondition the drilling fluid or drill-in fluid 222.

The disclosed drilling fluid or drill-in fluid 222 may directly or indirectly affect the pump 220, which representatively includes any conduits, pipelines, trucks, tubulars, and/or pipes used to fluidically convey the drilling fluid or drill-in fluid 222 downhole, any pumps, compressors, or motors (e.g., topside or downhole) used to drive the drilling fluid or drill-in fluid 222 into motion, any valves or related joints used to regulate the pressure or flow rate of the drilling fluid or drill-in fluid 222, and any sensors (i.e., pressure, temperature, flow rate, etc.), gauges, and/or combinations thereof, and the like. The disclosed drilling fluid or drill-in fluid 222 may also directly or indirectly affect the mixing hopper 234 and the retention pit 232 and their assorted variations.

The disclosed drilling fluid or drill-in fluid 222 may also directly or indirectly affect the various downhole equipment and tools that may come into contact with the drilling fluid or drill-in fluid 222 such as, but not limited to, the drill string 208, any floats, drill collars, mud motors, downhole motors and/or pumps associated with the drill string 208, and any MWD/LWD tools and related telemetry equipment, sensors or distributed sensors associated with the drill string 208. The disclosed drilling fluid or drill-in fluid 222 may also directly or indirectly affect any downhole heat exchangers, valves and corresponding actuation devices, tool seals, packers and other wellbore isolation devices or components, and the like associated with the wellbore 216. The disclosed drilling fluid or drill-in fluid 222 may also directly or indirectly affect the drill bit 214, which may include, but is not limited to, roller cone bits, PDC bits, natural diamond bits, any hole openers, reamers, coring bits, etc.

While not specifically illustrated herein, the disclosed drilling fluid or drill-in fluid 222 may also directly or indirectly affect any transport or delivery equipment used to convey the drilling fluid or drill-in fluid 222 to the drilling assembly 200 such as, for example, any transport vessels, conduits, pipelines, trucks, tubulars, and/or pipes used to fluidically move the drilling fluid or drill-in fluid 222 from one location to another, any pumps, compressors, or motors used to drive the drilling fluid or drill-in fluid 222 into motion, any valves or related joints used to regulate the pressure or flow rate of the drilling fluid or drill-in fluid 222, and any sensors (i.e., pressure and temperature), gauges, and/or combinations thereof, and the like.

It should be noted that while FIGS. 1-2 generally depicts a land-based assemblies, those skilled in the art will readily recognize that the principles described herein are equally applicable to subsea operations that employ floating or sea-based platforms and rigs, without departing from the scope of the disclosure.

Embodiments described herein include, but are not limited to, Embodiment A, Embodiment B, and Embodiment C.

Embodiment A is a treatment fluid comprising: a water having hardness at about 300 ppm or greater; a plurality of particulates; a swellable clay; a chelating agent at about 0.01% to about 5% BWOW; and an alkali metal base at about 0.01% to about 5% BWOW.

Embodiment A may optionally further include one or more of the following: Element 1: wherein the treatment fluid is as drilling fluid and the plurality of particulates comprises weighting agents and/or a cement and optionally wherein the cement (if present) comprises at least one selected from the group consisting of: perlite, cement kiln dust, fly ash, pumicite, slag, lime, shale, and Portland cement; Element 2: wherein the treatment fluid is as fracturing fluid and the plurality of particulates comprises proppant; Element 3: wherein the treatment fluid is as cement slurry and the plurality of particulates comprises a cement and optionally wherein the cement comprises at least one selected from the group consisting of: perlite, cement kiln dust, fly ash, pumicite, slag, lime, shale, and Portland cement; Element 4: wherein the swellable clay comprises at least one selected from the group consisting of: beidellite, montmorillonite, bentonite, nontronite, saponite, naturally occurring hectorite clay, synthetic hectorite clay, palygorskite, and lasallite; Element 5: wherein the swellable clay is present at about 0.1% to about 30% by weight of the treatment fluid; Element 6: wherein the chelating agent comprises at least one selected from the group consisting of: ethylenediaminetetraacetic acid, nitrilotriacetic acid, diethylenetriaminepentaacetic acid, trans-1,2-diaminocyclohexane-N,N,N',N'-tetraacetic acid, citric acid, diglycolic acid, phosphoric acid, aspartic acid, tripolyphosphate, hexametaphosphate, aminotris(methylenephosphonic acid), 1-hydroxyethane-1,1-diphosphonic acid, dimethyl methylphosphonate, ethylenediaminetetra(methylenephosphonic acid), tetramethylenediaminetetra(methylenephosphonic acid), hexamethylenediaminetetra(methylenephosphonic acid), diethylenetriaminepenta(methylenephosphonic acid), and a salt of any foregoing chelating agents; and Element 7: wherein the alkali metal base comprises at least one selected from the group consisting of: lithium hydroxide, sodium hydroxide, potassium hydroxide, and cesium hydroxide. Exemplary combinations may include, but are not limited to, one of Elements 1-3 in combination with one or more of Elements 4-7; Elements 4 and 5 in combination and optionally in further combination with Elements 6 and/or 7; Elements 4, 6, and 7 in combination and optionally in further combination with Element 5; and Elements 6 and 7 in combination and optionally in further combination with Element 5.

Embodiment B is a system comprising: a pump fluidly connected to a wellbore penetrating a subterranean formation that introduces a treatment fluid into the wellbore, wherein the treatment fluid is formed by mixing a water having hardness at about 300 ppm or greater with a plurality of particulates, a swellable clay, a chelating agent at about 0.01% to about 5% BWOW, and an alkali metal base at about 0.01% to about 5% BWOW.

Embodiment B may optionally further include one or more of the following: Element 4; Element 5; Element 6; and Element 7. Exemplary combinations may include, but are not limited to, Elements 4 and 5 in combination and optionally in further combination with Elements 6 and/or 7; Elements 4, 6, and 7 in combination and optionally in further combination with Element 5; and Elements 6 and 7 in combination and optionally in further combination with Element 5.

Embodiment C is a method comprising: mixing a water having hardness at about 300 ppm or greater with a plurality of particulates, a swellable clay, a chelating agent at about 0.01% to about 5% BWOW, and an alkali metal base at about 0.01% to about 5% BWOW to produce a treatment fluid; and introducing the treatment fluid into a wellbore penetrating a subterranean formation.

Embodiment C may optionally further include one or more of the following: Element 4; Element 5; Element 6; Element 7; Element 8: wherein the treatment fluid is as drilling fluid and the plurality of particulates comprises weighting agents, and wherein the method further comprises drilling at least a portion of the wellbore with the drilling fluid; Element 9: wherein the treatment fluid is as fracturing fluid and the plurality of particulates comprises proppant, and wherein the method further comprises forming a proppant pack in at least a portion of the subterranean formation with the fracturing fluid; Element 10: wherein the treatment fluid is as drilling fluid and the plurality of particulates comprises a cement, and wherein the method further comprises drilling at least a portion of the wellbore with the drilling fluid; Element 11: wherein the treatment fluid is as cement slurry and the plurality of particulates comprises a cement, and wherein the method further comprises setting the cement slurry in at least a portion of the wellbore and/or the subterranean formation; Element 12: Element 11 and wherein the cement comprises at least one selected from the group consisting of: perlite, cement kiln dust, fly ash, pumicite, slag, lime, shale, and Portland cement; and Element 13: Element 12 and wherein the Portland cement comprises at least one selected from the group consisting of: Class A, Class C, Class H, Class G, ASTM Type III, and ASTM Type V.

Exemplary combinations may include, but are not limited to, one of Elements 8-11 (with Element 11 optionally in combination with one or both of Elements 12-13) in combination with one or more of Elements 4-7 (e.g., Elements 4 and 5 in combination and optionally in further combination with Elements 6 and/or 7; Elements 4, 6, and 7 in combination and optionally in further combination with Element 5; and Elements 6 and 7 in combination and optionally in further combination with Element 5).

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1

Seven cement slurries at a density of 10 lb/gal were produced according to Table 1 with different waters and chelating agent/alkali base concentrations according to Table 2.

TABLE 1

| Component | Unit of Measurement | Quantity |
|---|---|---|
| Class G Cement | % BWOC | 100 |
| FDP ™-C984-10 [1] | % BWOW | 1.5 |
| MICROBLOCK ™ [2] | gallons/sack | 3 |
| ECONOLITE ™ Liquid [3] | gallons/sack | 1 |
| D-AIR ™ 3000-L [4] | gallons/sack | 0.1 |
| Water per Table 2 | gallons/sack | 40.56 |

[1] a synthetic swellable clay available from Halliburton Energy Services, Inc.
[2] silica powder available from Halliburton Energy Services, Inc.
[3] a cement set accelerator available from Halliburton Energy Services, Inc.
[4] a defoamer available from Halliburton Energy Services, Inc.

TABLE 2

| Sample | Water hardness (ppm) | Chelating Agent (% BWOW) | Alkali Base (% BWOW) | 10 min Gel Strength at 130° F. |
|---|---|---|---|---|
| 1 | 50 | — | — | 110 |
| 2 | 700 | — | — | 25 |
| 3 | 700 | 0.4 $Fe^{-2}$ | — | 20 |
| 4 | 700 | 0.4 HR-25 ™ [5] | — | 32 |
| 5 | 700 | 0.4 EDTA | — | 27 |
| 6 | 700 | 0.2 EDTA | — | 31 |
| 7 | 700 | 0.2 EDTA | 0.1 NaOH | 103 |

[5] a high-temperature retarder/intensifier available from Halliburton Energy Services, Inc.

Greater gel strengths indicate greater hydration of the swellable clay. As illustrated in this example, the inclusion of a small concentration of an alkali base with a low concentration of chelating agent almost negates the negative impact of the hard water.

Example 2

Four cement slurries at a density of 10 lb/gal were produced according to Table 1 with different waters and chelating agent/alkali base concentrations according to Table 2.

TABLE 3

| Component | Unit of Measurement | Quantity |
|---|---|---|
| Class G Cement | % BWOC | 100 |
| FDP ™-C984-10 | % BWOW | 1.5 |
| Silicate | gallons/sack | 60 |
| ECONOLITE ™ Liquid | gallons/sack | 0.8 |
| D-AIR ™ 3000-L | gallons/sack | 0.05 |
| Water per Table 4 | gallons/sack | 55.75 |

TABLE 4

| Sample | Water hardness (ppm) | Chelating Agent (% BWOW) | Alkali Base (% BWOW) | 10 min Gel Strength at 150° F. |
|---|---|---|---|---|
| 8 | 375 | — | — | 20 |
| 9 | 375 | 0.15 EDTA | 0.05 NaOH | 110 |
| 10 | 375 | 0.15 EDTA | — | 7 |
| 11 | 375 | — | 0.05 NaOH | 45 |

Figure 3:
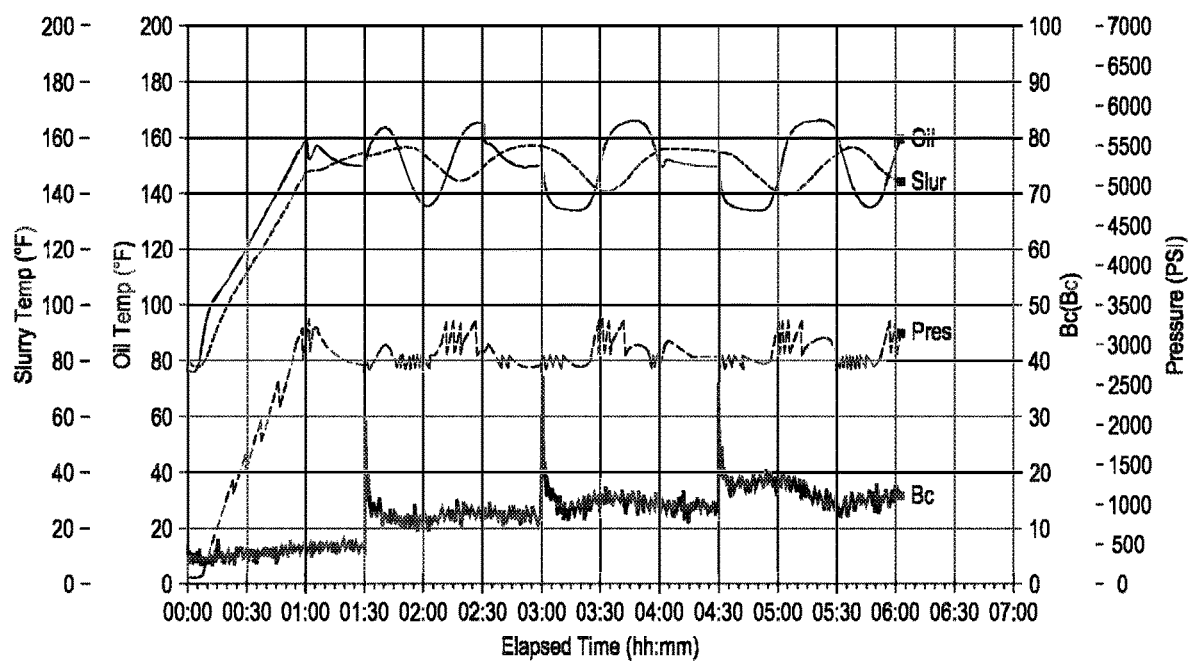
FIG. 3 is an on-off thickening plot for a cement sample.
Figure 4:
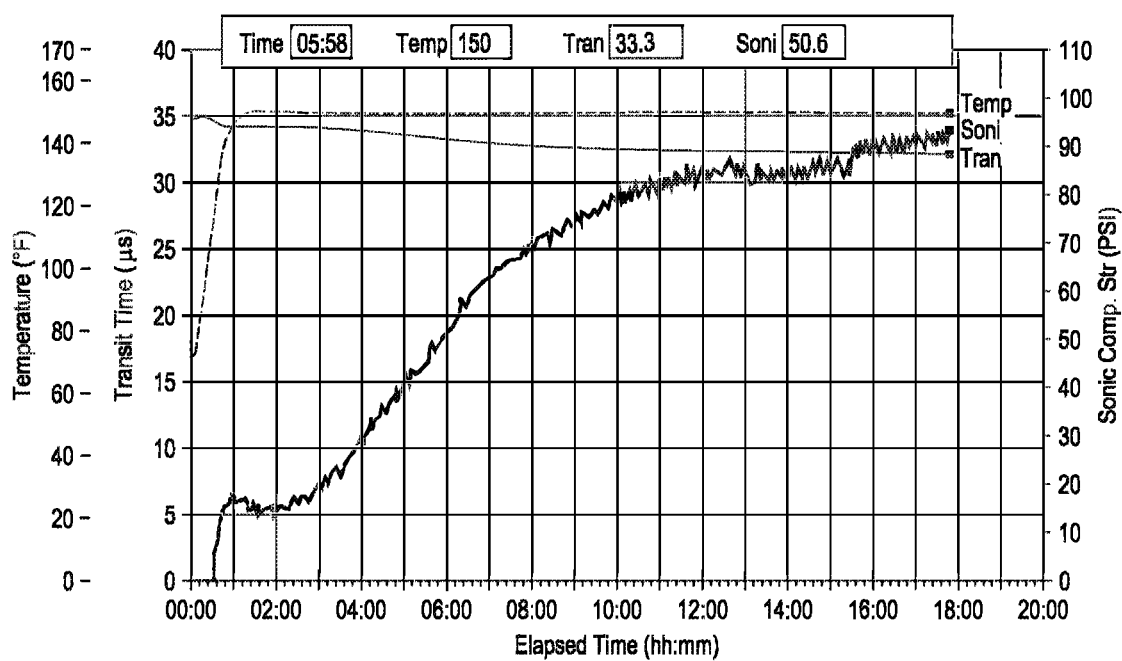
FIG. 4 is an ultrasonic cement analysis plot for a cement sample.
Figure 5:
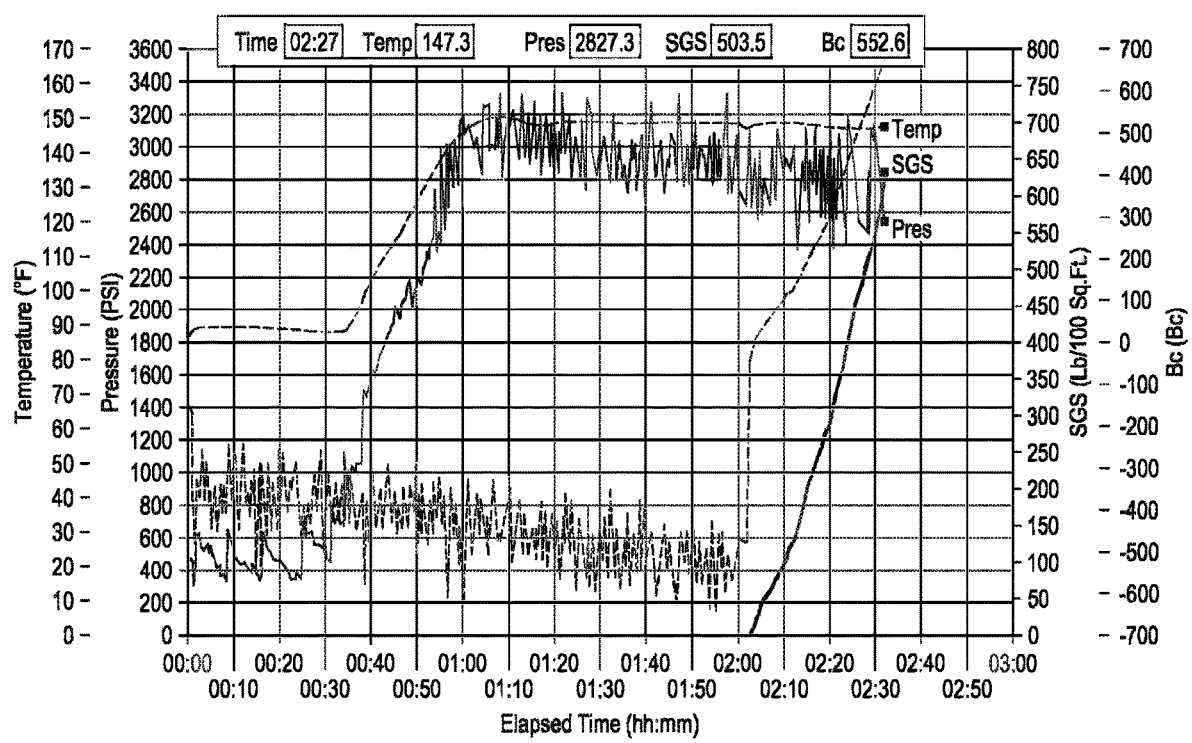
FIG. 5 a static gel strength plot for a cement sample.

Further, FIGS. 3-5 illustrate the properties of Sample 9. FIG. 3 is an on-off thickening plot where the slurry was sheared (stirred) for a certain amount of time followed by 15 static minutes. The shear/static cycle was performed three times. When shear was initiated, there was a spike in the slurry consistency as measured in Bearden units of consistency (Bc), which indicates that the gel strength of the slurry would build up in downhole conditions.

FIG. 4 is an ultrasonic cement analysis plot of the cement slurry that measures the compressive strength of the slurry as it hardens. Within about 6 hours, Sample 9 developed a compressive strength of about 50 psi, which illustrates that the combination of a chelating agent and alkali base helps develop a stable gel in hard water.

FIG. 5 a static gel strength plot of Sample 9. After stirring for 2 hours, the slurry was kept static and analyzed. Within about 17 minutes, the slurry increased in static gel strength (SGS) by about 400 lb/100 ft$^2$ (from about 100 lb/100 ft$^2$ to about 500 lb/100 ft$^2$), which illustrates that the combination of a chelating agent and alkali base assists in quickly forming strong gels.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A cement slurry comprising:
    a water having hardness of 300 ppm or greater with a plurality of particulates;
    cement;
    a swellable clay;
    a set accelerator;
    a defoamer;
    a chelating agent at about 0.01% to about 5% by weight of the water (BWOW); and
    an alkali metal base at about 0.01% to about 5% BWOW, wherein the chelating agent and alkali metal base reduce the negative effect of the water on hydrating swellable clays.

2. The cement slurry of claim 1, wherein the swellable clay comprises at least one selected from the group consisting of: beidellite, montmorillonite, bentonite, nontronite, saponite, naturally occurring hectorite clay, synthetic hectorite clay, palygorskite, and lasallite.

3. The cement slurry of claim 1, wherein the swellable clay is present at about 0.1% to about 30% by weight of a treatment fluid.

4. The cement slurry of claim 1, wherein the chelating agent comprises at least one selected from the group consisting of: ethylenediaminetetraacetic acid, nitrilotriacetic acid, diethylenetriaminepentaacetic acid, trans-1,2-diaminocyclohexaneN,N,N',N'-tetraacetic acid, citric acid, diglycolic acid, phosphoric acid, aspartic acid, tripolyphosphate, hexametaphosphate, aminotris(methylenephosphonic acid), 1-hydroxyethane-1,1-diphosphonic acid, dimethyl methylphosphonate, ethylenediaminetetra(methylenephosphonic acid), tetramethylenediaminetetra(methylenephosphonic acid), hexamethylenediaminetetra(methylenephosphonic acid), diethylenetriaminepenta(methylenephosphonic acid), and a salt of any foregoing chelating agents.

5. The cement slurry claim 1, wherein the alkali metal base comprises at least one selected from the group consisting of: lithium hydroxide, sodium hydroxide, potassium hydroxide, and cesium hydroxide.

6. The cement slurry of claim 1, wherein the cement comprises at least one selected from the group consisting of: perlite, cement kiln dust, fly ash, pumicite, slag, lime, shale, and Portland cement.

7. The cement slurry of claim 6, wherein the Portland cement comprises at least one selected from the group consisting of: Class A, Class C, Class H, Class G, ASTM Type III, and ASTM Type V.

8. The cement slurry of claim 1 further comprising a dispersant.

9. The cement slurry of claim 8, wherein the dispersant further comprises betaines, sulfated, sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates, sodium dodecane sulfonate, trim ethyl hexadecyl ammonium bromide, and any combination thereof.

10. The cement slurry of claim 8, wherein the dispersant is present at about 0.1% to about 25% by weight of a treatment fluid.

11. A cement slurry comprising:
a water having hardness at about 300 ppm with a plurality of particulates;
a Portland cement;
a swellable clay at about 0.1% to about 30% by weight of a treatment fluid;
a set accelerator at about 0.1% to about 5% by weight of cement;
a defoamer;
a chelating agent at about 0.01% to about 0.2% by weight of the water (BWOW); and
an alkali metal base at about 0.01% to about 0.1% BWOW, wherein the chelating agent and alkali metal base reduce the negative effect of the water on hydrating swellable clays.

12. The cement slurry of claim 11, further comprising a dispersant.

13. The cement slurry of claim 12, wherein the dispersant further comprises betaines, sulfated, sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates, sodium dodecane sulfonate, trim ethyl hexadecyl ammonium bromide, and any combination thereof.

14. The cement slurry of claim 12, wherein the dispersant is present at about 0.1% to about 25% by weight of the treatment fluid.

15. A cement slurry comprising:
a water having hardness at about 300 ppm to about 6000 ppm with a plurality of particulates;
a Portland cement;
a swellable clay at about 0.1% to about 30% by weight of a treatment fluid;
a set accelerator at about 0.1% to about 5% by weight of cement;
a defoamer;
a chelating agent at about 0.01% to about 0.15% by weight of the water (BWOW); and
an alkali metal base at about 0.01% to about 0.05% BWOW, wherein the chelating agent and alkali metal base reduce the negative effect of the water on hydrating swellable clays.

16. The cement slurry of claim 15, wherein the chelating agent is ethylenediaminetetraacetic acid (EDTA), and wherein the EDTA is present in amount of 0.15% BWOW, and wherein the alkali metal base is sodium hydroxide (NaOH), and wherein the NaOH is present in amount of 0.05% BWOW.

17. The cement slurry of claim 15, wherein the Portland cement comprises at least one selected from the group consisting of: Class A, Class C, Class H, Class G, ASTM Type III, and ASTM Type V.

18. The cement slurry of claim 15, further comprising a dispersant.

19. The cement slurry of claim 18, wherein the dispersant further comprises betaines, sulfated, sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates, sodium dodecane sulfonate, trim ethyl hexadecyl ammonium bromide, and any combination thereof.

20. The cement slurry of claim 18, wherein the dispersant is present at about 0.1% to about 25% by weight of the treatment fluid.

* * * * *

UNITED STATES PATENT AND TRADEMARK OFFICE
CERTIFICATE OF CORRECTION

PATENT NO. : 11,130,707 B2
APPLICATION NO. : 16/880839
DATED : September 28, 2021
INVENTOR(S) : Patil et al.

It is certified that error appears in the above-identified patent and that said Letters Patent is hereby corrected as shown below:

In the Claims

In Column 12, Line 50, Claim 04, please delete "trans-1,2-diaminocyclohexaneN," and replace with --trans-1,2-diaminocyclohexane-N,--.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*